United States Patent [19]

Ledgerwood

[11] Patent Number: 4,538,839
[45] Date of Patent: Sep. 3, 1985

[54] PIPE JOINT COUPLING

[75] Inventor: Harry J. Ledgerwood, Marshfield, Mo.

[73] Assignee: Plessey Incorporated, Los Angeles, Calif.

[21] Appl. No.: 628,657

[22] Filed: Jul. 6, 1984

Related U.S. Application Data

[63] Continuation-in-part of Ser. No. 574,585, Jan. 27, 1984, abandoned.

[51] Int. Cl.³ .............................................. F16L 21/06
[52] U.S. Cl. .................................... 285/236; 285/373
[58] Field of Search ....... 285/236, 371, 259, 369 (U.S. only), 285/373

[56] References Cited

U.S. PATENT DOCUMENTS

| | | | |
|---|---|---|---|
| 1,175,834 | 3/1916 | Stephens | 285/259 X |
| 2,147,355 | 2/1939 | Scholtes | 285/259 X |
| 2,367,447 | 1/1945 | Strout | 285/259 X |
| 2,371,971 | 3/1945 | Main et al. | 285/259 |
| 2,481,001 | 9/1949 | Burckle | 285/259 X |
| 2,793,883 | 5/1957 | Main, Jr. | 285/229 |
| 3,142,502 | 7/1964 | Luther | 285/259 X |
| 3,233,922 | 2/1966 | Evans | 285/236 |
| 3,359,017 | 3/1967 | Schaub | 285/236 |
| 3,402,946 | 9/1968 | Dedian | 285/236 |
| 3,627,353 | 12/1971 | Blumenfeld et al. | 285/39 |
| 3,933,377 | 1/1976 | Arrowood | 285/61 |
| 4,026,586 | 5/1977 | Kennedy, Jr. et al. | 285/236 |
| 4,226,446 | 10/1980 | Burrington | 285/259 X |
| 4,380,348 | 4/1983 | Swartz | 285/373 X |

Primary Examiner—Thomas F. Callaghan
Attorney, Agent, or Firm—Fleit, Jacobson, Cohn & Price

[57] ABSTRACT

A pipe joint coupling for joining cast iron hubless drain and vent pipes. The joint is encircled by an annular elastic gasket fitting over each end of the adjacent pipe sections. The elastic gasket is surrounded by a shield with a diamond pattern of projections and depressions. The shield is tightened by bands to compress the gasket against the pipes and to secure the adjacent ends of the pipes together. A tight seal is formed between the gasket and the pipe ends which is maintained under high pressure fluid passing through the pipes. The gasket is prevented from extruding from the shield by the gripping of the projections of the diamond pattern of the shield on the gasket. An improved seal between the pipes being joined is formed with increased resistant to the displacement of the gasket.

4 Claims, 8 Drawing Figures

PIPE JOINT COUPLING

This application is a continuation-in-part of U.S. patent application Ser. No. 574,585, filed Jan. 27, 1984, and now abandoned.

BACKGROUND OF THE INVENTION

Pipe couplings are know for the joining of the ends of pipe sections. A shield of a pipe coupling compresses a gasket against pipe sections to be joined by the tightening of bands around the shield.

In U.S. Pat. No. 3,233,922 to Evans, a joint is provided for sections of cast iron pipes having substantially identical ends arranged in alignment. A coupling band is applied around the adjacent pipe ends to effect a pressure tight seal without appreciably increasing the total outer diameter of the pipe sections to be joined. An annular resilient packing member is placed over the ends of the pipes to be joined, on top of which is placed the coupling band. The coupling band overlaps and surrounds the adjacent ends of the pipe sections. The annular resilient packing member is interposed between the coupling band and the pipe ends and bridges the pipe ends. The packing member is of a width substantially the same as that of the coupling band and the packing member is provided on the inner surface of the coupling band and has an annular raised ridge fitting between the aligned pipe ends to prevent contact of the pipe ends. The coupling band holds the pipe ends together to form a joint and also compresses the packing member tightly around both ends to seal the joint. The band is made of a high-quality stainless steel and is provided with a series of transversely extending corrugations throughout the entire length of the coupling band. The corrugations are placed around the pipes in alignment parallel to the longitudinal axis of the pipes. If the pipe sections are of slightly different diameters, the area of the coupling band surrounding the larger pipe section expands due to the flattening of the corrugations in that area. The coupling band tightens the adjacent pipe ends by the use of two tightening straps surrounding the coupling band adjacent to the edges of the band, to seal the joint by compressing the packing member.

U.S. Pat. No. 3,359,017 to Schaub, is an improvement over the patent to Evans. The pipe coupling consists of a corrugated sheet metal shield which is closed by clamping bands, with the shield ends overlapping an annular elastic gasket fitted over adjacent pipe ends. The overlapped shield end is flat and merges into a tapered shield portion formed by corrugations of progressively increasing height. This avoids increasing frictional resistance of the bands during the tightening of the straps.

The patent to Schaub discloses one end of the corrugated shield overlapping the other end of the shield in the direction of circumferential displacement of the clamping straps. A "reverse overlap" arrangement provides reduced frictional resistance of the surfaces contracting around the gasket surrounding the pipe ends. One end of the shield is substantially flat, being smooth on both sides and extending for a distance from the corrugated portion of the shield.

The tightening straps of the patents to Evans and Schaub are connected to the shield by rivets extending through both the coupling shield and the tightening straps or by welding of the coupling shield to the tightening straps.

SUMMARY OF THE INVENTION

The present invention is an improvement over the pipe joint couplings of the prior art in that a coupling shield is used to hold a gasket in place around the ends of two pipe sections to be joined. The coupling shield has a series of corrugations aligned perpendicular to each other and parallel to the longitudinal and transverse axis respectively of the coupling shield. In the rectangular areas formed between the intersections of the corrugations are formed a series of projections forming a diamond-pattern appearance.

It is an object of the present invention to provide an improved pipe joint coupling.

It is another object of the present invention to securely hold a gasket around the ends of two pipe sections to be joined by a shield clamped by a plurality of bands.

It is yet another object of the present invention to minimize extrusion of a gasket under pressure surrounding the ends of two pipe sections to be joined.

It is a further object of the present invention to clamp a coupling shield having a diamond-pattern appearance around a gasket.

It is a yet a further object of the present invention to secure a band to a shield by having a piece of the band extend from the band through a hole in the shield.

It is a still further object of the invention to have the projections of the diamond-pattern shield grip the gasket interposed between the shield and pipe to minimize extrusion of the gasket when the joined pipes convey a liquid under pressure.

DETAILED DESCRIPTION OF THE DRAWINGS

Figure 1:
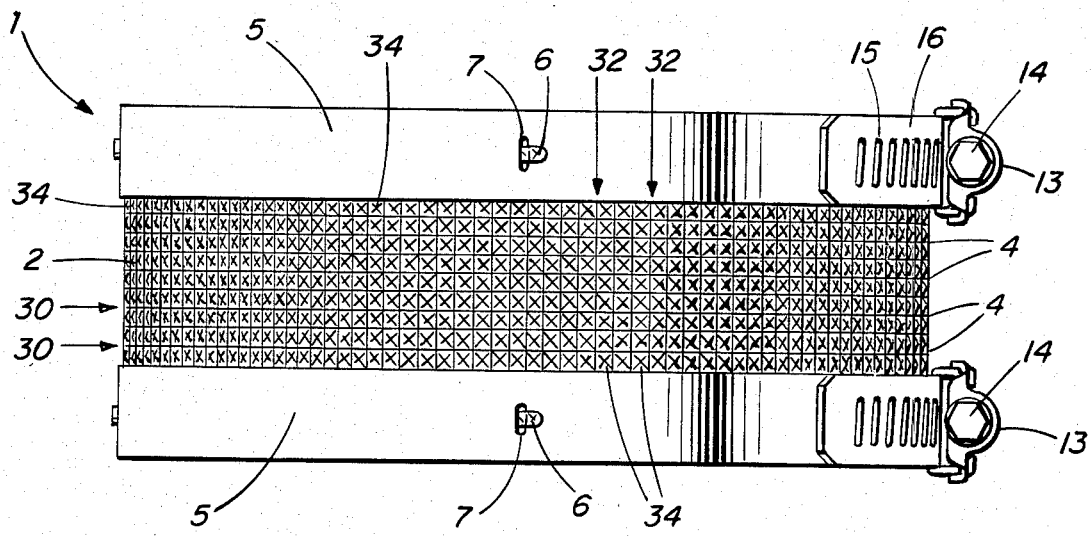
FIG. 1 is a side view of a pipe coupling with portions of a shield extending through each surrounding band.
Figure 3:
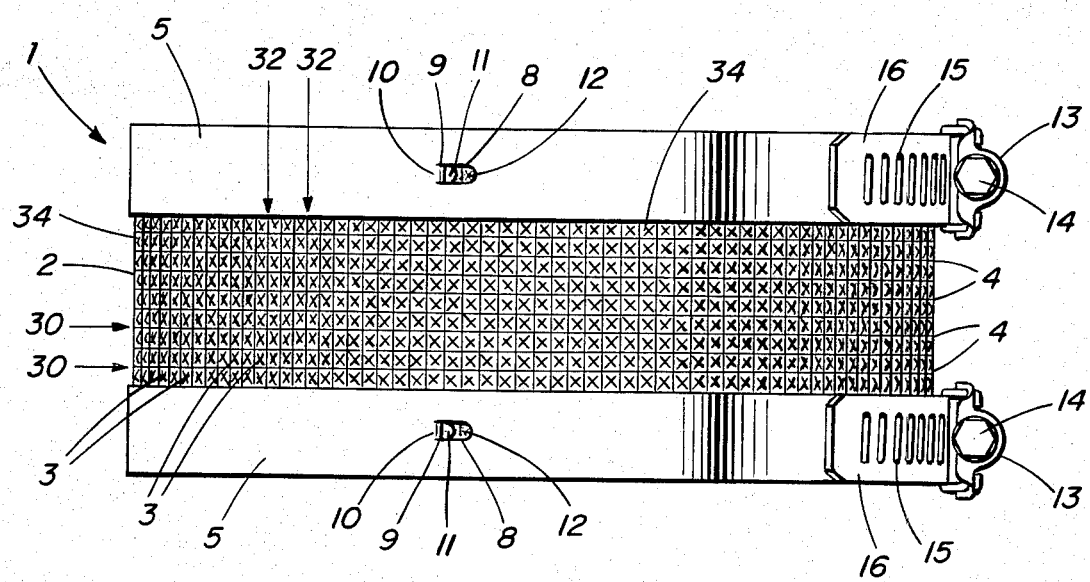
FIG. 3 is a side view of a pipe coupling with a portion of each band extending through an aperture defined by the shield.

The pipe coupling of the present invention is generally shown at 1 in FIGS. 1 and 3. A coupling shield 2 is formed with perpendicular corrugations 30,32 extending parallel respectively to the longitudinal (corrugations 30) and transverse (corrugations 32) axes of the coupling shield. In the rectangular areas 34 formed by the intersection of perpendicular corrugations 30,32, on both sides of the coupling shield, extends a projection 3. The projection 3 extending from the surface, of each rectangle 34 tapers down towards depressed corners 4 of each rectangle 34 formed by the intersection of the corrugations 30,32. A projection 3 on one side of the coupling shield forms a depressed corner 4 on the other side of the shield 2 and understandably the depressed corners 4 of one rectangle 34 on one side of the shield, form four projections 3 on the other side of the coupling shield 2 surrounding a single depressed corner 4.

Figure 5:
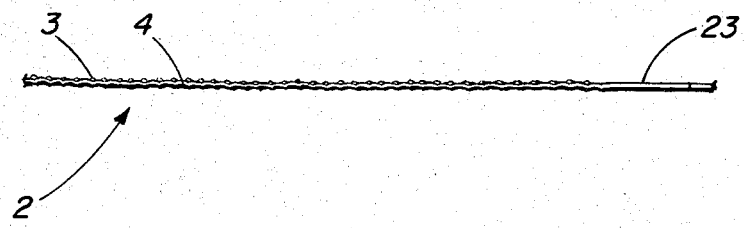
FIG. 5 is a side view of the coupling shield shown in FIG. 4 taken along the lines 5—5.
Figure 6:
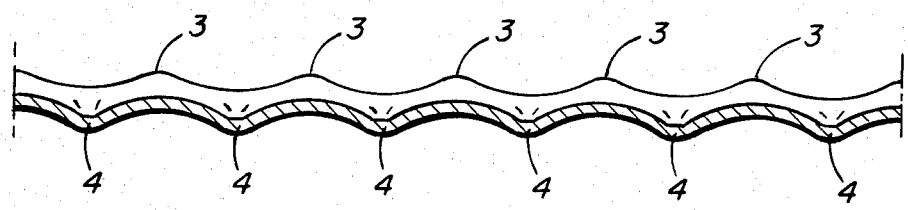
FIG. 6 is a section view of a portion of the coupling shield shown in FIG. 4 along line 6—6.
Figure 7:
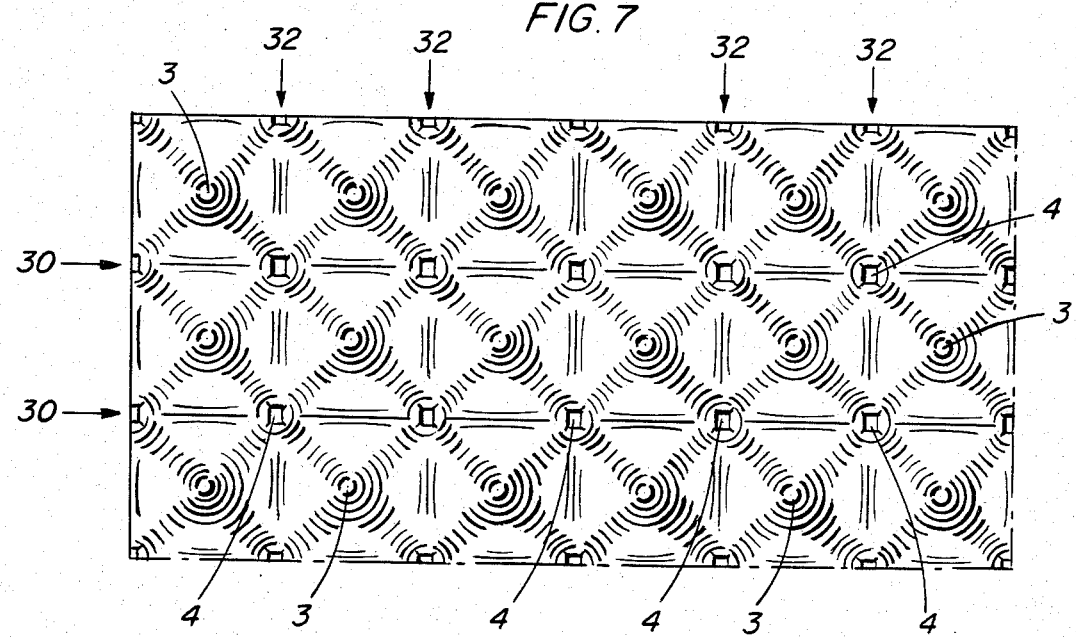
FIG. 7 is a detailed plan view of a portion of the coupling shield shown in FIG. 4.
Figure 8:
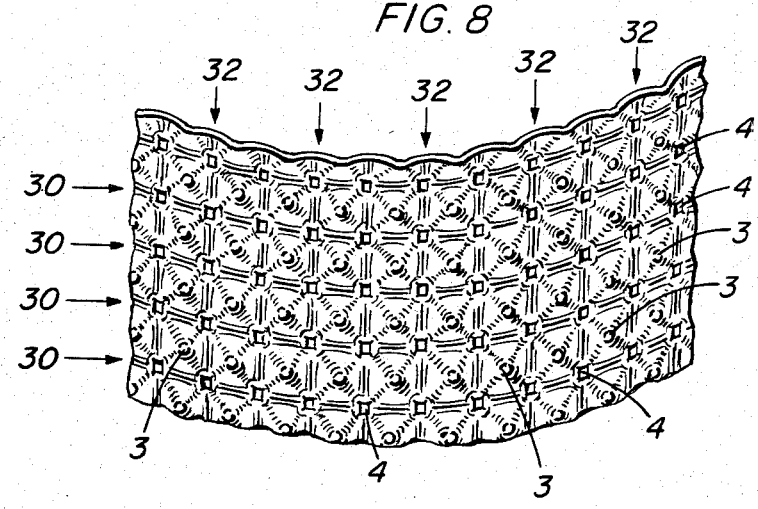
FIG. 8 is a detailed perspective view of a portion of the coupling shield shown in FIG. 4.

The alternating rows of projections 3 and the depressed corners 4 are shown in FIG. 5. The projections 3 and depressed corners 4, viewed along the side edges of shield 2, illustrate the undulating appearance formed by perpendicular corrugations 30,32. The diamond pattern appearance formed by the series of projections 3 repeated across the shield is seen on either side of the shield, and is a series of raised projections 3 in a center of a series of rectangles 34 with the corners 4 of the rectangles 34 aligned to form perpendicular corrugations 30,32 aligned parallel to the longitudinal corrugations 30 and transverse (corrugations 32) axes of the shield 2. The depressed corners 4 form a series of rectangles 34 with the space between these corners 4 gradually rising towards the plane formed by the projections 3 formed as points and falling to the plane formed by another corner. Therefore, although, in side view, the longitudinal axis of each corrugation appears to be in a continuous flat plane, in a plan view the corrugations are made up of a series of parallel, aligned, depressed areas with the area 4 between adjacent depressed areas 4 rising toward and falling from the plane formed by an elevated projection points 3 formed in the center of the rectangles 34 formed by the depressed corner areas 4.

The alternating projections and depressed corners of each rectangle of shield 2 serve to grip an elastic neoprene gasket disposed between the shield 2 and the ends of two pipe sections to be joined. The points 3 of the diamond pattern grip and slightly deform the gasket, forcing the gasket into the recessed corner areas 4 to reduce the elongation of the gasket when tightened and when subject to high liquid pressure flowing through the pipes. The coupling shield is used with a pipe joint coupling for cast iron hubless drain and vent pipes. The diamond-pattern projections 3 allow the coupling shield to seal aligned pipe ends having slight differences in outside diameter The shield is sufficiently pliable to conform to the different diameters of the pipes simultaneously.

The shield 2 is surrounded by two stainless steel bands 5. Each band 5 is connected to the shield 2 at two points spaced from one another. A known method of attaching the band 5 to the shield 2 is by inserting a rivet through apertures defined by the shield 2 and band 5 and flanging out of the rivet on one side of the shield and on one side of the shield. Another method of attaching the band to the shield is by welding.

By the present invention, the shield is connected to the band 5 by the insertion of a tab 6 defined by the shield 2 through a slot 7 defined by the band 5. The tab is then crimped over onto the exterior surface of the band 5. This is done at two locations on each band 5. The two tabs 6 are bent in a direction opposite to each other on each band 5 to firmly secure the band 5 to the shield 2. One tab 6 extending through slot 7 is shown in FIG. 1.

In a preferred embodiment for attaching the band 5 to shield 2, two slots 8 are defined by each band 5. Slot 8 has two parallel sides and a curved side connecting the two parallel sides. A hole is defined by shield 2 and a tab portion 9 of slot 8 anchored by end piece 10 of slot 8 is bent down through hole 11 in shield 2. The tab portion 9 is bent to point in a direction parallel to the inner surface of the band 5 being on the opposite side of the shield 2 from that of end piece 10. An area 12 defined by the outer surface of shield 2 is seen from above through the slot 8 as shown in FIG. 3. There are two slots 8 formed in each of the bands 5 and the tab portions 9 are bent through the holes 11 and around shield 2 so that the tab portions 9 are pointing in a direction towards each other along the shortest distance between the tab portions along the inner surface of the shield 2. The securing of each band 5 to the shield 2 by two tab portions bent around the shield forms a tight fit of the bands to the shield without requiring the addition of a third joining piece such as an rivet.

Each band 5 surrounding the shield 2 overlaps onto itself. A tightening unit 13 holds one end of the band stationary and moves the overlapping end over the stationary end. The tightening unit moves the band by rotation of threaded bolts 14. Grooves 15 are cut in overlapping section 16 of band 5. By rotation of the bolts 14, the overlapping portion 16 threaded through the tightening unit 13 is advanced and the bands 5 and shield 2 are tightened around a gasket and the two pipe sections to be joined. Opposite rotation of the bolts 14 releases the bands 5.

Figure 2:
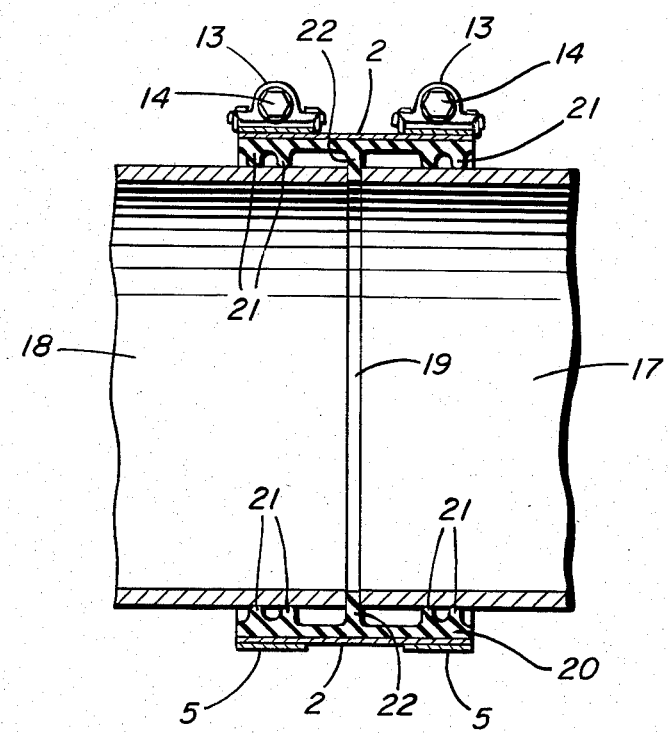
FIG. 2 is a sectional view of a pipe coupling compressing a gasket onto adjacent ends of two pipe sections.

As shown in FIG. 2, adjacent pipe sections 17 and 18 are positioned adjacent to each other and are separated by space 19. An annular neoprene gasket 20 includes spacing ridges 21 and separating ridge 22. The annular spacing ridge 21 and separating ridge 22 of the gasket 20 are compressed by shield 2 when the tightening unit 13 is tightened. The gasket 20 overlaps the ends of the pipe sections 17 and 18 and spaces the pipe sections away from each other. The rotation of bolt 14 draws the bands tighter and thus the shield 2 onto gasket 20. The shield 2 is of the same width as the gasket. The projections 3 and depressed corners 4 of the shield 2 are compressed onto the gasket 20. The projections 3 and depressed corners 4 of the shield 2 bite into the gasket 20 preventing shifting of the gasket 20 away from the shield 2. The shield uniformly compresses the gasket 20 against the ends of pipe sections 17 and 18. The pressure of the tightening units 13 against shield 2 uniformly contacts the gasket 20 and forms a tight seal around the openings of pipes 17 and 18. The separating ridge 22 spaces pipe sections 17 and 18 away from each other, providing for subsequent settlement or slight movement of the pipes. The shield 2 adapts to differing diameters of the pipe section.

Figure 4:
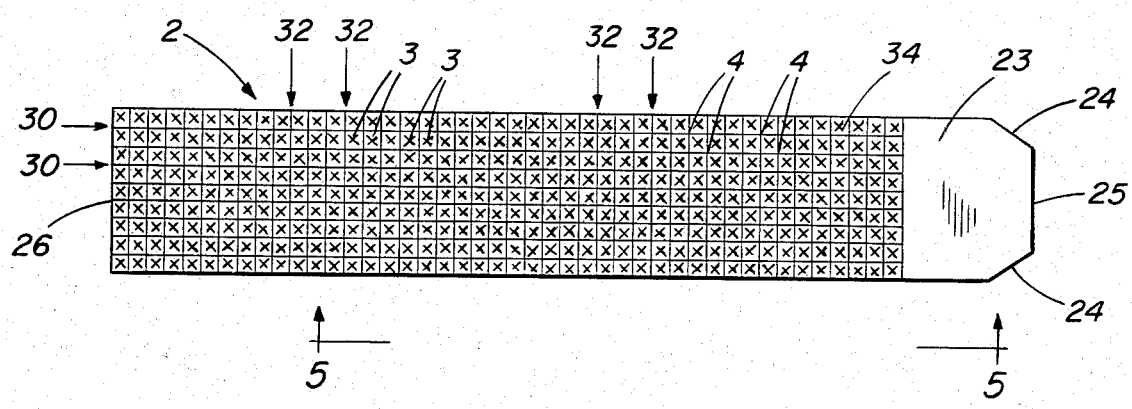
FIG. 4 is a side view of the coupling shield having a diamond-pattern surface and a flat end portion.

The shield 2, as shown in FIG. 4, includes a series of projections 3 and depressed corners 4 forming a diamond-shaped pattern on top and bottom surfaces of the coupling shield. An end portion 23 of shield 2 is flat and smooth. The shield 2 of FIG. 4 is on a smaller scale than the same shield 2 shown in FIGS. 1 through 3. The bands 5 are laid along the outer edges of shield 2 as shown in FIG. 2. The end portion 23 have diagonal corners 24 forming a leading edge 25 between the corners.

When the shield surrounds the gasket, the end portion 23 is positioned under trailing edge 26 and closest to the gasket 20. The trailing edge 26 is disposed closest to the surrounding bands 5. The end portion 23 being of a flat, uncorrugated construction, aids in the sliding of the trailing edge 26 across the raised projections of shield 2 when tightening unit 13 is actuated to cause the closing of the coupling 1. The construction of the shield 2 is such that even when the raised projections and depressed corners at the area closest to the end portion 23 are sliding across the raised projections and depressed corners of trailing edge 26 of shield 2, there is little resistance to the sliding movement of the ends of shield 2 over each other.

Tests were conducted between the coupling with the diamond pattern shield 2 having perpendicular corrugations 30,32 aligned respectively parallel to the longitudinal axis and transverse axis of the coupling shield compared to a shield having parallel corrugations extending along only the transverse axis of the coupling as shown in the patents to Schaub and Evans. The results of these tests proved the increased sealing power of the diamond pattern shield with perpendicular corrugations 30,32 as compared to that of a single-direction corrugated shield. The bands in the test were tightened and placed under a 60 pound torque. The pressure through the pipes to be joined was gradually increased over time until reaching a 20 lb/in² maximum pressure. The extension of the gasket between the shield and the pipes was measured for each pressure over a period of time. It was found that, under pressure, the gasket would extrude through the slots of the single corrugation shield of the prior art. Improved results were demonstrated by the diamondpattern shield with the gasket being held in position against the multiple raised projections 3 and depressed corners 4 biting into the gasket surrounding the pipe sections to be joined. The results of these tests have been provided in Table 1.

The test results shown in Table 1 reflect the best and worst test results for a 3 and 4 inch pipe joint coupling. There was one test performed for each style of 1.5 and 2 inch pipe joint coupling. It can be seen from the test results that the diamond-shape pattern shield coupling is of a superior sealing ability. Even at low pressures the expansion of the gasket is noticed with the single-direction corrugated shield of the prior art. The diamond-pattern shield entraps the gasket, and prevents the gasket from extruding from the pipe joint coupling when under pressure.

Another series of tests revealed greatly increased retention ability for the diamond-pattern coupling shield compared to a Schaub-type coupling shield. Two, three and four inch pipe joints were tested and the respective increased retention ability in the following categories were measured for the present invention: Movment (psi) +30.8%, +6.7%, −8.3%, Leak (psi) +20.3%, +18.2%, +38.1%; Blowout (psi) +18.1%, +18.2%, +38.1%; Blowout (ft. WC) +17.9%, +18.4%, +38.6%; and Total Force (Pounds) +17.99%, +18.1%, +38.1%.

Although several illustrative embodiments of the present invention have been described in detail herein with reference to the accompanying drawings, it is to be understood that the invention is not limited to these precise embodiments, and that various changes and modifications may be effected therein by one of ordinary skill in the art without departing from the spirit or scope of the invention as defined in the dependent claims.

TABLE 1

| Gasket Extension (in.) | Time (Min.) | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| | Pressure (lbs./in²) | | | | | | | | | | | | | |
| | 2 | 4 | 6 | 8 | 10 | 12 | 14 | 16 | 18 | 20 | 20 | 20 | 20 | 20 |
| 4" Corrugated (Worst) (.029" Corrugation Height) | .002 | .007 | .015 | .029 | .075 | .165 | .620 | Failed | | | | | | |
| 4" Corrugated (Best) (.0285" Corrugation Height) | .001 | .003 | .006 | .009 | .012 | .017 | .024 | .031 | .039 | .047 | .049 | .051 | .053 | .055 |
| 4" Diamond Pattern (Worst) (.031" Corrugation Height) | .001 | .004 | .009 | .015 | .025 | .060 | .115 | .195 | .320 | .460 | Failed | | | |
| 4" Diamond Pattern (Best) (.029" Corrugation Height) | .001 | .002 | .003 | .005 | .008 | .011 | .015 | .021 | .026 | .031 | .032 | .033 | .034 | .035 |
| 3" Corrugated (Worst) (.029" Corrugation Height) | .002 | .004 | .007 | .010 | .014 | .029 | .040 | .065 | .090 | .014 | .210 | .360 | .495 | .590 |
| 3" Corrugated (Best) (.029" Corrugation Height) | 0 | .001 | .002 | .003 | .005 | .008 | .012 | .016 | .020 | .025 | .027 | .028 | .029 | .030 |
| 3" Diamond Pattern (Worst) (.030" Corrugated Height) | .001 | .002 | .003 | .004 | .005 | .007 | .012 | .017 | .021 | .027 | .033 | .036 | .038 | .039 |
| 3" Diamond Pattern (Best) (.032" Corrugation Height) | 0 | .001 | .002 | .003 | .005 | .007 | .009 | .014 | .020 | .025 | .028 | .030 | .032 | .034 |
| 2" Corrugated (.032" Corrugation Height) | .001 | .002 | .003 | .005 | .008 | .011 | .015 | .019 | .023 | .027 | .027 | .027 | .0275 | .028 |
| 2" Diamond Pattern (.033 Corrugation Height) | .001 | .002 | .003 | .004 | .006 | .008 | .010 | .013 | .016 | .019 | .019 | .019 | .020 | .020 |
| 1.5" Corrugated (.032" Corrugation Height) | .001 | .001 | .002 | .002 | .003 | .003 | .004 | .005 | .006 | .007 | .007 | .008 | .008 | .0085 |
| 1.5" Diamond Pattern (.030" Corrugation Height) | 0 | .001 | .001 | .002 | .002 | .003 | .003 | .004 | .004 | .005 | .005 | .005 | .005 | .005 |

I claim:

1. A pipe coupling for holding a resilient gasket around the ends of two pipes, said coupling comprising:
   a thin-walled coupling shield,
   first corrugations defined by said coupling shield extending through both sides of said coupling shield and extending substantially parallel to the longitudinal axis of the coupling shield,
   second corrugations defined by said coupling shield extending through both sides of said coupling shield and extending transverse to the longitudinal axis of the coupling shield, said first corrugations and said second corrugations extending across a substantial portion of the width and length of said coupling shield,
   a plurality of rectangles formed by the intersections of said first corrugations and said second corrugations,
   a projection formed within each of said plurality of rectangles for biting into said resilient gasket during tightening of said coupling shield around said gasket to prevent extrusion of said gasket from the sides of said coupling shield,
   a plurality of sets of four depressed corners, one set of four depressed corners being located at the corners of each of said plurality of rectangles formed by the intersection of two adjacent first corrugations and two adjacent second corrugations, each set of four depressed corners surrounding one of said projections, and means for tightening said coupling shield around said resilient gasket to locate the ends of two pipes adjacent one another and to seal a gap formed between the two pipe ends during fluid flow.

2. A pipe coupling as claimed in claim 1, wherein said means for tightening includes two adjustable clamping bands surrounding said coupling shield.

3. A pipe coupling as claimed in claim 2, wherein a portion of each of said two bands secures each of said two bands to said coupling shield.

4. A pipe coupling as claimed in claim 3, wherein said portion of each of said two bands extends through an opening defined by the coupling shield and is bent to secure said two bands to said coupling shield.

* * * * *